Feb. 7, 1961  F. H. CARY  2,970,476
PNEUMATIC PRESSURE RATIO APPARATUS
Filed June 19, 1956  2 Sheets-Sheet 1

INVENTOR.
Francis H. Cary
BY
Barlow & Barlow
ATTORNEYS.

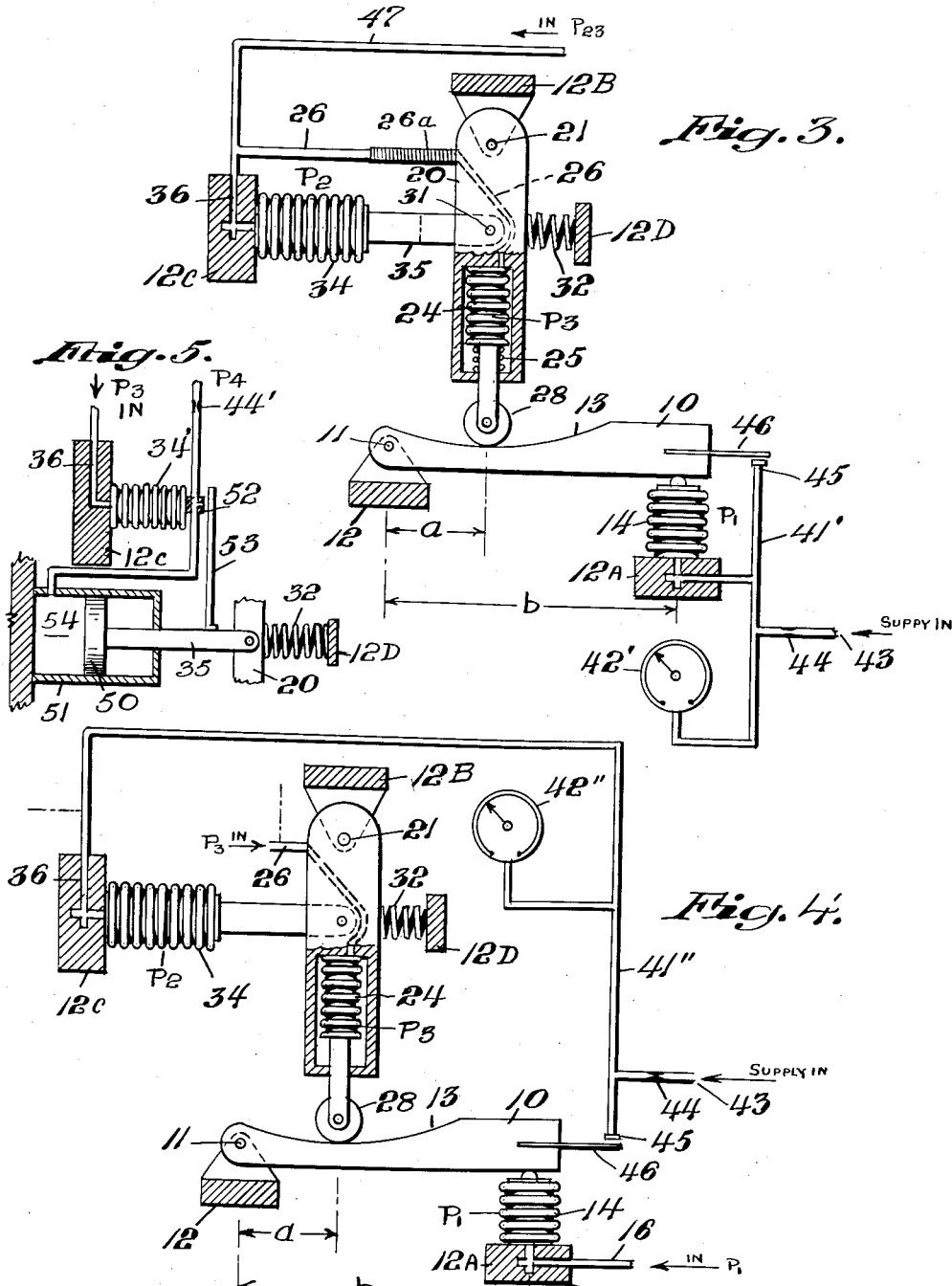

United States Patent Office 2,970,476
Patented Feb. 7, 1961

2,970,476

PNEUMATIC PRESSURE RATIO APPARATUS

Francis H. Cary, Warwick, R.I., assignor to B-I-F Industries, Inc., a corporation of Rhode Island Filed June 19, 1956, Ser. No. 592,288

5 Claims. (Cl. 73—407)

This invention relates to a pressure function converting apparatus and more particularly apparatus which is adapted to relate fluid pressures in various mathematical relationships.

It is an object of the invention to provide an apparatus wherein two variables are automatically multiplied and the result obtained as a fluid pressure.

Another object of the invention is to provide an apparatus wherein the input pressure will be related to the output pressure as the one-half power thereof.

A still further object of the invention is to provide an apparatus wherein two variables are automatically divided and the result obtained as a fluid pressure.

A still further object of the invention is to provide an apparatus wherein the input pressure will be related to the output pressure as the second power thereof.

With these and other objects in view, the invention consists of certain novel features of construction as will be more fully described and particularly pointed out in the appended claims.

In the accompanying drawings:

Figure 3 is another diagrammatic view showing the apparatus arranged to raise the input pressure to the second power;

Figure 4 is a diagrammatic view showing the apparatus arranged to produce a quotient;

Figure 5 is a diagrammatic view of a booster device that may be used with the apparatus.

In proceeding with this invention, I provide three pressure responsive elements which are coupled together through lever arms and linkages so that certain forces act on these arms over certain distances whereby the pressures in these elements may be related in a known manner.

Figure 1:
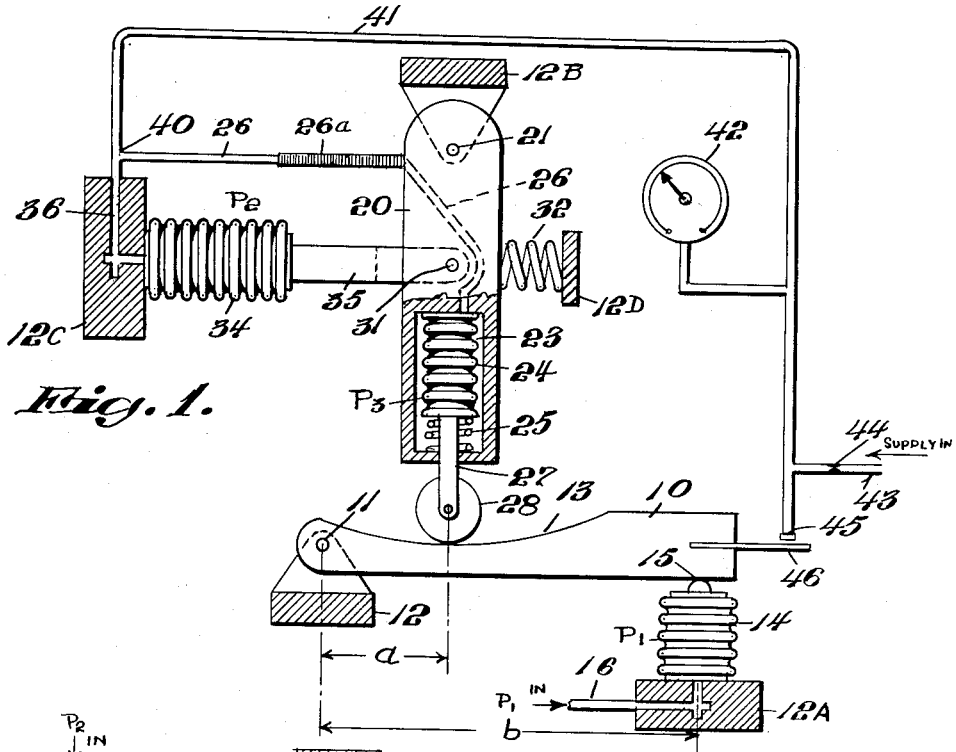
Figure 1 is a diagrammatic view showing the apparatus arranged to produce a square root.

Referring to the drawings where there are diagrammed possible arrangements for securing the desired result with no structural details intended to be shown, and particularly to Figure 1, I provide a lever arm 10 which is pivoted as at 11 to a fixed surface 12. This lever arm has mounted near one end thereof a pressure responsive device 14 which is shown as a collapsible bellows and which is mounted on a fixed support 12A. This device 14 has a contact button 15 which engages the lever arm. The pressure responsive device 14 is connected through a suitable duct system as 16 to a source of variable pressure which is to be mathematically related.

A second lever arm 20 is pivoted to a fixed support 12B as at 21. Mounted within the interior of this lever arm 20 is a second pressure responsive device 24 which is held within a recess 23 by a spring 25. The interior of the bellows device is connected to a source of pressure by a pipe 26 having a suitable telescoping or flexible section 26a, while an operating rod 27 extends from the element and has fixed to the end thereof a rotatable wheel 28. This rotatable wheel 28 is adapted to engage the lever arm 10 and specifically engages an arcuate surface 13 thereon, the radius of which may be described from the pivot point 21 of the lever arm 20. Thus, the lever arm 10 is provided with a longitudinal arcuate surface for the engagement of a wheel 28 so that varying positions of wheel 28 thereon will not effect the position of arm 10 with constant pressure in bellows 24.

A third pressure responsive device 34 also shown in the form of a collapsible bellows is mounted generally at right angles to the lever 20 on a fixed support 12C and has an operating link 35 connected therewith. This operating link is pivotally related as at 31 to the arm 20 so that any forces exerted by the pressure element 34 will tend to swing the arm 20 about its pivot 21. A spring 32, shown diagrammatically as mounted between a fixed support 12D and the lever arm 20, engages the lever arm 20 on the side opposite to the engagement of the arm 35 and resists the operation of the pressure element to a suitable degree.

To provide an output pressure which may be related to an input pressure at the pipe 16 that will be a function of the square root thereof, it is necessary that the two pressure responsive elements 24 and 34 be connected together. To that end, therefore, the pipes 26 and 36 may be connected together as at 40 and lead thence through a line 41 to a pressure indicating instrument, shown as a gauge 42. To provide an operating reference for the system, it is necessary to utilize a regulated supply of fluid pressure which may be connected, as at 43 through a restricting or isolating orifice 44 to the line 41. Additionally, the line 41 must be provided with a suitable nozzle and regulating system to relate the pressure in the line 41 to the operation thereof. For this purpose there is provided a nozzle 45 and a flapper 46, the flapper being connected to the lever arm 10, and the nozzle 45 and orifice 44 being sized so that a constant pressure will be present in line 41 with the flapper fully removed from nozzle 45.

In order to appreciate how these various parts function, the operation thereof will be described. Let us assume that there is applied to the line 41 and measured therein a pressure of ten pounds. This pressure of ten pounds will tend to relate the arm 20 at a finite location with respect to the pivot point 11 of the lever arm 10. Let us therefore call the distance between this pivot point and the point of contact of the roller 28 distance $a$, and let us also call the lever arm acting upon the pressure responsive element 14 distance $b$. It will be readily apparent that we have a situation here wherein to have balanced forces on the lever arm 10, the force exerted by the pressure in element 14 times its lever arm distance $b$ must equal the force exerted by the pressure in element 24 multiplied by its lever arm distance $a$. It must also be realized that the pressure element 34 is exerting a force on the lever arm 20. Because of this fact we may express the angular relationship of the lever arm 20 as a function of the pressure $P_2$ or $P_2 \propto \tan \theta$ (where $\theta$ is the angle arm 20 describes relative to its zero position when in line with pivot point 11). Thus, the distance $a$ referred to will be proportional to $\tan \theta$ ($a \propto \tan \theta$) and can be expressed as a constant $k$ times the pressure $P_2$ or $kP_2$. Expressing the above mathematically, we have, therefore, $P_1 \times b = P_2 \times a$ and $a = kP_2$. Substituting, we have $P_1 \times b = k(P_2)^2$ and reducing the above $P_2 = kb\sqrt{P_1}$. Let us further assume that the balance of the apparatus is disturbed by an increase of the variable input pressure $P_1$. The pressure element 14 will expand and move the arm 10 upward and the flapper 46 toward the nozzle 45. When this occurs, less air can escape from nozzle 45 and the pressure in line 41, pressure element 34, and pressure element 24 will be increased. The downward force on arm 10 will thereby be increased until a balance between the upward and downward forces on arm 10 is restored. Conversely, a decrease in the variable input pressure $P_1$ will first allow the flapper 46 to recede from the nozzle 45, thereby lowering the pressure in elements 34 and 24, and the downward force on arm 10 until the upward and downward forces on arm 10 are again in balance. Thereforce, with any input pressure to duct 16, the output measured on a meter or any other indicating instrument 42 will be to the one-half power of the input pressure.

It is obvious that the springs 25 and 32 can be adjusted and the arm 10 counter-balanced to permit using, in the controlled pressure line 41, the common pressure range of 3 to 15 p.s.i. without detriment to the mathematical relationship or accuracy of the apparatus.

Figure 2:
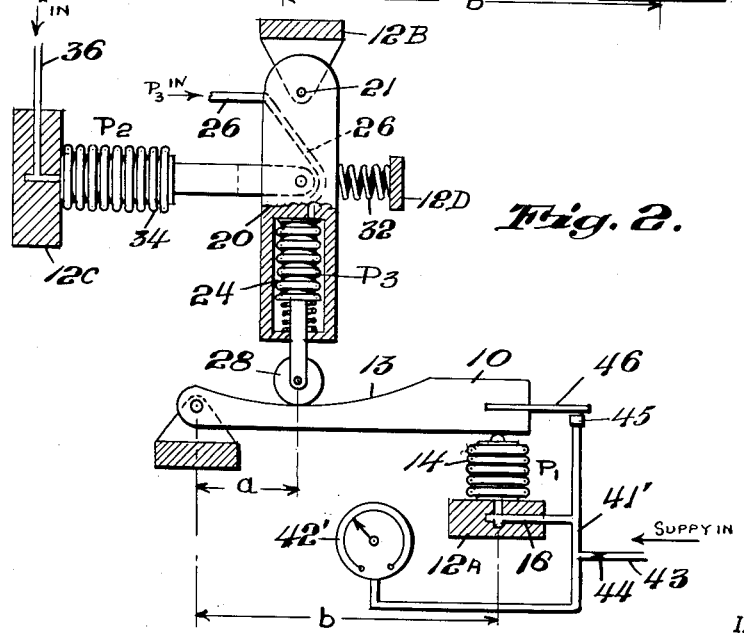
Figure 2 is a diagrammatic view showing the apparatus arranged to multiply.

In Figure 2, wherein like parts have like reference numerals, there is shown the device modified to multiply two input pressures. To this end, a supply of regulated fluid pressure is connected at 43 through a restricting or isolating orifice 44 to a line 41' that is connected to the pressure responsive device 14 by line 16 and to a pressure regulating orifice 45. An output pressure indicating device illustrated as a gauge 42' is connected to line 41' and a flapper 46, connected to lever arm 10, co-operates with the orifice 45 to relate the pressure in line 41' to the position of arm 10. The input pressures, which may be from different sources, are supplied at 36 and 26 to act, respectively, on pressure responsive devices 34 and 24.

The operation of the apparatus of Figure 2 will be such that the pressure applied to line 36 will relate the arm 20 at a finite position with respect to the arcuate portion 13 of arm 10. Similarly, the pressure applied to line 26 will exert a force through wheel 28 to lever arm 10 that will be opposed by the pressure $P_1$ in line 41' applied through the devices to lever arm 10. In order to obtain equilibrium or balanced forces upon lever arm 10, it will be apparent that pressure in element 14 times its lever arm $b$ must equal pressure in element 24 multiplied by its lever arm distance $a$. It will also be apparent that the pressure in device 34 is in fact defining the position of the application of force by element 24 and thus we may say that the distance $a$ is equal to a constant $k \times P_2$. We thus have the equations $P_1 \times b = P_3 \times a$ and $a = kP_2$. Substituting for $a$ in the first formula and reducing the equation an equality of $P_1$, we find $$P_1 = \frac{k}{b}(P_2 P_3)$$

Therefore, with any particular set of variables being applied to lines 26 and 36, the output registered on gauge 42' would be proportionate to the products of these two pressures.

In Figure 3 wherein like parts have like reference numerals as in the preceding figures, there is shown a slight modification of the device of Figure 2 which will perform to raise an input pressure to the second power. Mathematically it is known such an operation is nothing more than a multiplication and thus, by connecting together lines 26 and 36 to a common input line 47, it will be apparent that such an operation may be performed. The line 47, therefore, may be connected to a single source of pressure. Mathematically we have a situation in which $P_1 \times b = P_2 \times a$ and $a = kP_2$. Reducing above equations to a function of $P_1$, it will be seen that $P_1$ is equal to $$\frac{k}{b}(P_2)^2$$

In Figure 4 wherein like parts have like reference numerals as in the previous figures, there is shown the device modified to produce a quotient of two input pressures. To this end a supply of regulated fluid pressure is connected at 43 to a restricting or isolating orifice 44 to a line 41'' that is connected as at 36 to the pressure responsive device 34. A visual gauge 42'' is inserted in this line 41''. A flapper 46 connected to lever arm 10 cooperates with orifice 45 at the end of line 41'' to control the pressure in line 41 so that the moment of the pressure $P_3$ at the radius $a$ will balance the moment of the pressure $P_1$ at radius $b$. In operation of the device of Figure 4, it will be apparent that input pressure applied to line 16 and represented by the symbol $P_1$ is, in effect, being opposed by the second input pressure applied at line 26 and represented by the symbol $P_3$. These two pressures are, of course, operating over different lever arm distances. The pressure $P_1$ is operating over distance $b$ and pressure $P_3$ is operating over a distance $a$. It will also be noted that the pressure in device 34 which is represented by symbol $P_2$ controls the distance $a$ at which the pressure $P_3$ acts on the lever arm 10. Thus, as analyzed in the previous embodiments, we have a mathematical relation existing in this embodiment in which $P_1 \times b = P_3 \times a$ wherein distance $a = kP_2$. Substituting in the above two equations and reducing the equations to a function of $P_2$, it will be found that $$P_2 = \frac{b}{k}\left(\frac{P_1}{P_3}\right)$$

The device shown in Figure 4 will also operate by breaking line 41'' at the dashed lines and connecting it to line 26. The variable pressures may then be supplied to devices 14 and 34 and the relationship of $$P_3 = \frac{b}{k}\left(\frac{P_1}{P_2}\right)$$

will evolve.

It will be appreciated that the pressure responsive element 34 may be equipped with booster means, well known in the art, for augmenting the primary pressure to increase the accuracy of position of the arm 20. Such a booster means may take the form shown in Figure 5 wherein a power piston 50 is connected to the link 35. The cylinder 51 forms a pressure chamber 54 which is connected to a separate source of pressure $P_4$ through a restricting orifice 44' and a bleed nozzle 52 carried by the bellows device 34'. Nozzle 52 discharges against an abutment 53 mounted on link 35. The fixed surface 12C, the pipe 36, the pressure $P_3$, the arm 20, the spring 32, and the fixed abutment 12D correspond to like parts in Figures 1 to 4. In operation, with an increasing pressure in line 36, bellows 34' will expand, tending to close nozzle 52 and thus building up pressure in chamber 54 which will move piston 50 and abutment 53. Abutment 53 moves away from nozzle 52 until equilibrium is established. The converse will be true with a decreasing pressure in line 36.

It will be apparent, therefore, that I have produced an apparatus which is susceptible of some variations that will render it suitable for relating input pressures in different manners to obtain the product, quotient, square, or square root thereof. Certain applications of the apparatus will, of course, suggest themselves. For example, the device of Figure 1 will be useful in flow metering. To this end, the downstream pressure will first be subtracted from the upstream pressure by suitable apparatus and the net differential connected at 16. Since the differential pressure is the square of flow, it will be apparent that the output of the apparatus will be a direct measurement of flow. The apparatus of Figure 2 may be useful in a chemical feeding system for water treatment or the like wherein $P_2$ would be a pacing signal from a flow meter and $P_3$ a pressure signal corresponding to the demand of chemical additive. The output pressure of the apparatus would then be used to control the rate of feed of the chemical which would be in accordance with the rate of flow and intensity of demand. The apparatus of Figure 3 might similarly be used to control a chemical feeder if the feeder has a square characteristic and the flow signal pressure $P_2$ is linear. The apparatus of Figure 4 may be used as an indicator in a sewage treatment plant where it is desired to know the amount of air vs. amount of raw sewage, thus giving a figure indicating the efficiency of the operation of the plant. In such a case the signal representing the amount of air will be $P_1$, while the signal representing the flow of sewage will be $P_3$.

I claim:

1. A pressure converting apparatus comprising an arm pivoted at one end and having a longitudinal arcuate edge, a pressure responsive device positioned to exert a force at the other end of said arm, a second arm pivoted at one end at a location in the plane of movement of the first arm, the pivoting axis of said second arm forming the center of the arcuate edge of said first arm, said second arm including a second pressure responsive device exerting a force between the pivot point of said second arm and said arcuate edge, a third pressure responsive device positioned to exert a force intermediate said second arm to adjust the moment arm of said second device on the first arm, said first pressure responsive device creating an opposing moment arm.

2. An apparatus as in claim 1 wherein said second and third devices are connected together and said first device is connected to a pressure to be measured whereby the pressure in said second and third devices will be a function of the square root of the pressure in said first device.

3. An apparatus as in claim 1 wherein said second and third devices are connected, respectively, to pressures to be related and the pressure in said first device is a function of the product of the pressures connected to the second and third devices.

4. An apparatus as in claim 1 wherein said first and third devices are connected, respectively, to pressures to be related and the pressure in said second device is a function of the quotient of the pressures connected, respectively, to the first and third devices.

5. An apparatus as in claim 1 wherein said second and third devices are connected together and to a pressure to be measured and the pressure in said first device is related to the pressure in said second and third devices as the square thereof.

References Cited in the file of this patent

UNITED STATES PATENTS

| | | |
|---|---|---|
| 2,317,293 | Newell | Apr. 20, 1943 |
| 2,394,284 | Berges | Feb. 5, 1946 |
| 2,487,310 | Chandler | Nov. 8, 1949 |
| 2,507,498 | Brown | May 16, 1950 |
| 2,521,477 | Pellettere | Sept. 5, 1950 |
| 2,736,199 | Ibbott | Feb. 28, 1956 |